Aug. 11, 1959          J. R. THOMAS          2,899,035
VARIABLE SPEED AND TORQUE TRANSMITTING FLUID CLUTCH
Filed Aug. 6, 1956          4 Sheets-Sheet 1
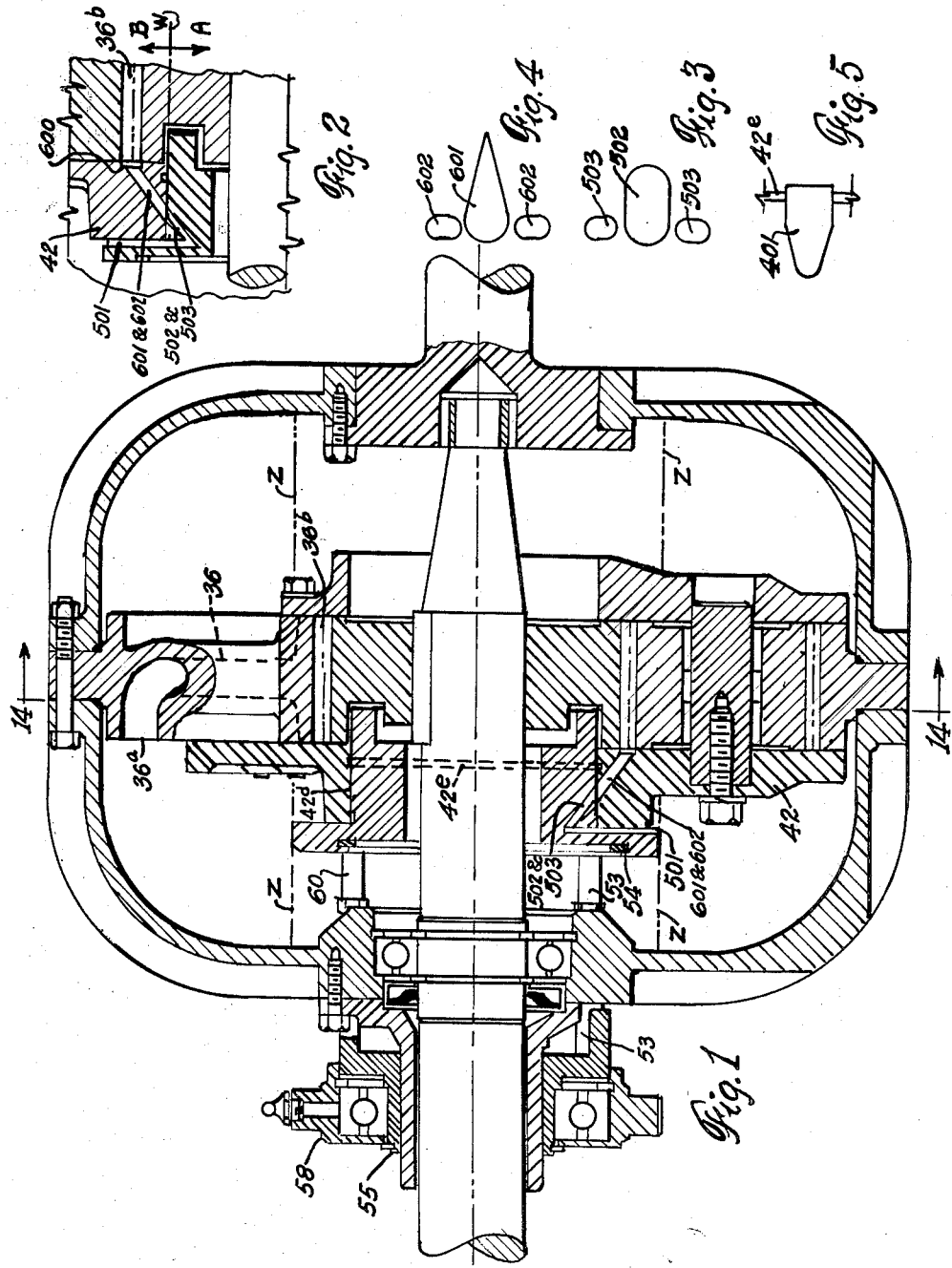
INVENTOR.
John R. Thomas
BY Frank J. Schroeder Jr.
Attorney Aug. 11, 1959    J. R. THOMAS    2,899,035
VARIABLE SPEED AND TORQUE TRANSMITTING FLUID CLUTCH
Filed Aug. 6, 1956    4 Sheets-Sheet 2
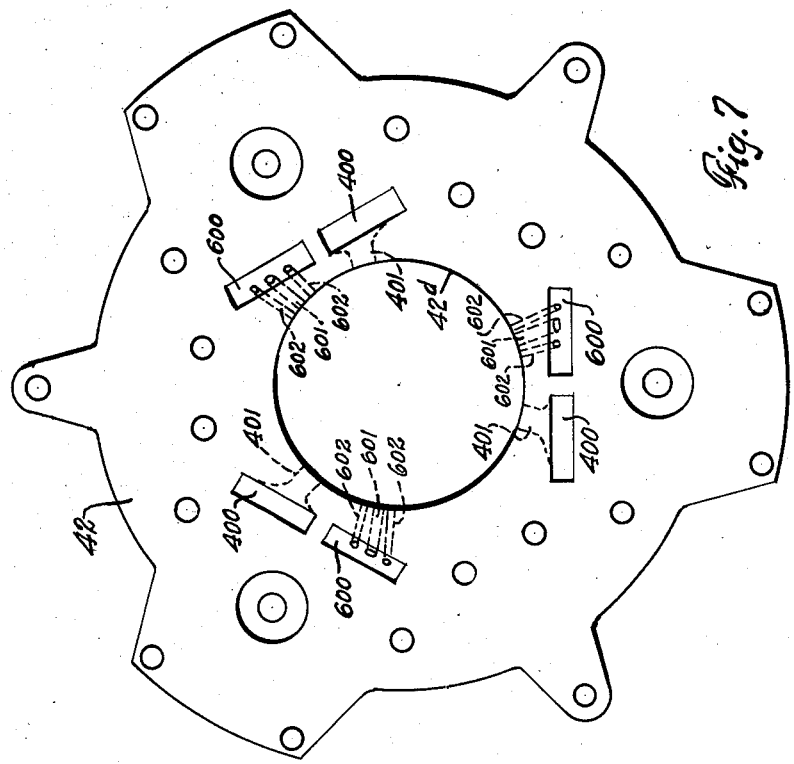
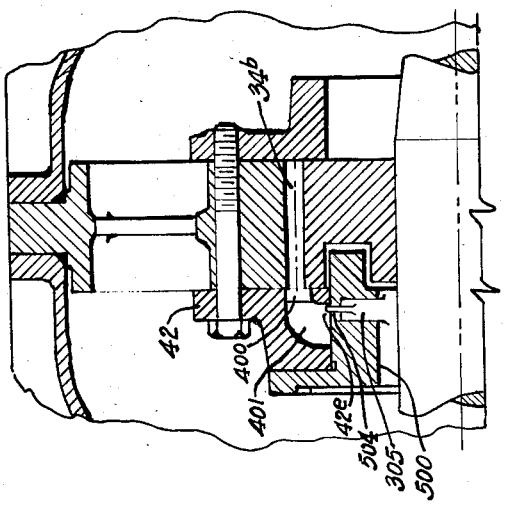
INVENTOR.
John R. Thomas
BY Frank J. Schraeder Jr.
Attorney

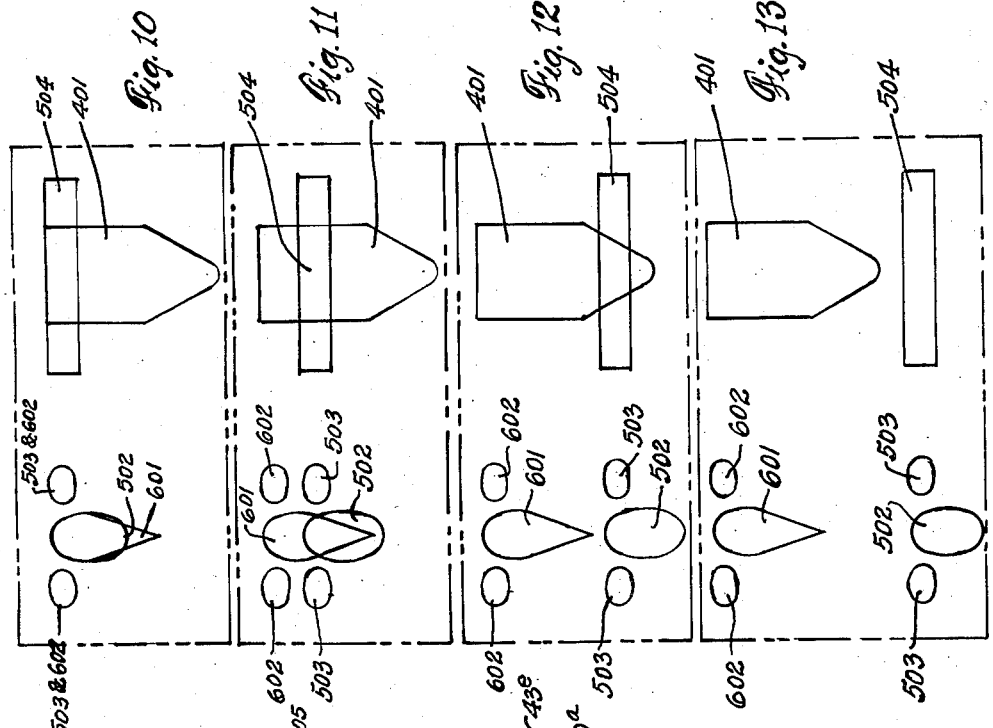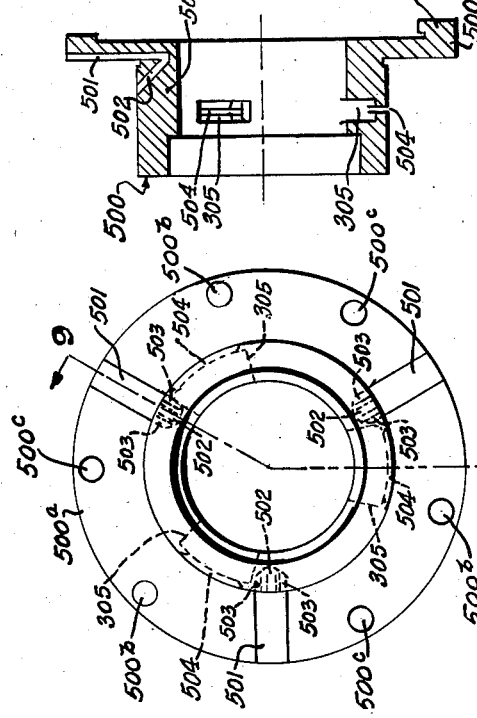

United States Patent Office 2,899,035
Patented Aug. 11, 1959

2,899,035

VARIABLE SPEED AND TORQUE TRANSMITTING FLUID CLUTCH

John R. Thomas, Wichita, Kans., assignor to Thomas Hydraulic Speed Controls, Inc., Wichita, Kans., a corporation of Kansas Application August 6, 1956, Serial No. 602,172

11 Claims. (Cl. 192—61)

The present invention has among its objects to simplify the construction and increase the scope of adaptability for certain applications of variable speed and torque transmitting fluid clutches or couplings of the type and character disclosed in my prior Patents No. 2,658,595 issued November 10, 1953, and No. 2,712,867 issued July 12, 1955, to which reference is made herein for purposes of complete disclosure of the present invention; in the clutches disclosed in said prior patents and in the herein disclosure of the present invention, two fluids of different resistant value such as, for example, air and oil are employed.

It is an object of this invention to simplify the construction of the herein disclosed clutch whereby a substantial reduction in cost of manufacture is attained together with enhanced efficiency of operation characterized by a more stabilized and precise torque and speed control and comparatively less yielding of the selected desired output speed, during partial engagement, in response to variations in loads imposed upon the machine or implement driven by the clutch and also characterized by a greater range and smoothness of controllability than that heretofore attained by my prior clutches.

Another important object of the present invention resides in the novel function of the clutch attained by the complete elimination of valve control for the oil circuit inlet openings and the interposition of a single combined fluid intake and discharge control valve for controlling the flow of both air and oil through the power transmitting pump in relatively varied proportionate mixtures or independently.

Another object of the invention is found in the provision of a novel power-transmitting fluid clutch wherein the air and oil fluids flow into the pump circuits through independent ports having independent inlet openings; the air inlet openings being disposed within an inner central zone of air in the clutch casing and the oil inlet openings being constantly fully open and disposed within the outer annular zone of oil, and the flow of both fluids through the pump, independently or in relatively variable proportionate mixtures, being controlled by a single fluid flow control valve.

Another novel feature of the invention resides in the utilization of the centrifugal force acting upon the oil annulus conjointly with control solely of variable intake of air by fluid flow control means, within the central zone of air, whereby, responsively to such control of the variable volumetric flow of air from maximum to zero, the flow of oil from the oil annulus is automatically fed into the pump circuits for admixture with the air in variable proportions relatively to the volumetric flow of air, or independently of the air.

Still another feature of the invention is found in the provision of a single novel fluid flow control valve together with novel porting in the valve and its seat.

The various features of novelty whereby the present invention is characterized will hereinafter be pointed out with particularity in the appended claims, however, for a full understanding of the invention and of its objects and advantages reference may be had to my above-referred-to two prior patents together with the following description taken in connection with the accompanying drawings, exemplifying a preferred embodiment of the invention, wherein:

Fig. 1 is a longitudinal section through a hydraulic clutch embodying a preferred form of my invention; the section being taken on line A—A of Fig. 14;

Fig. 2 is a fragmentary section through the fluid flow control valve and valve seat of the manifold;

Fig. 3 is a diagrammatic view of one of the groups of three air intake openings as viewed on the outer periphery of the fluid control valve on line W in Fig. 2 looking in the direction of arrow A;

Fig. 4 is a diagrammatic view of one of the groups of three air intake openings as viewed on the periphery of the valve seat on line W in Fig. 2 looking in the direction of arrow B;

Fig. 5 is diagrammatic view of one of the three fluid control outlet openings as viewed looking at the valve seat of the manifold;

Fig. 6 is a fragmentary section showing fluid discharge ports and valve for controlling discharge of air, mixtures of air and oil, or of only oil, or for completely arresting the flow of oil;

Fig. 7 is an elevational view of the inner face of the manifold showing fluid intake and discharge recesses and their respective communicating air intake ports and fluid discharge ports;

Fig. 8 is an end elevational view of the fluid flow control valve;

Fig. 9 is a cross-section of the fluid flow control valve taken on line 9—9 of Fig. 8;

Figure 14:
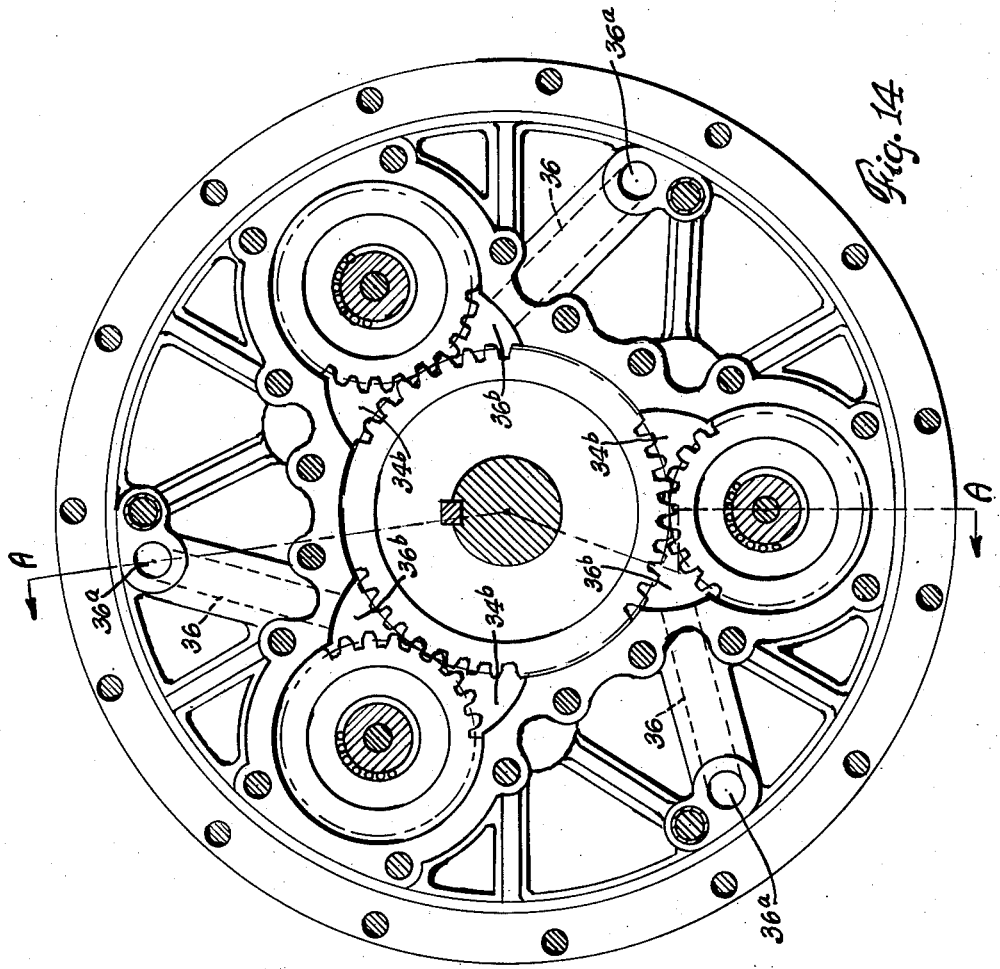

Figs. 10, 11, 12 and 13 are schematic illustrations showing the relative positions of two groups of companion air intake port openings concurrently with the relative positions of one of the valve seat fluid outlet openings and its cooperative fluid discharge control slot in the fluid control valve, during progressively advanced positions of the fluid flow control valve; and Fig. 14 is a diagrammatic view of the planetary gear pump taken on line 14—14 of Fig. 1.

Only certain pertinent principal elements of the clutches disclosed in said patents are designated herein by identical reference numerals employed for such elements in said patents; the elements shown but not designated by reference numerals are the same or equivalent elements as employed in said patents.

All new elements disclosed in the attached drawings are designated by reference numerals with three digits beginning with numeral 400.

Among the new improvements in the present clutch, as compared with the disclosures in said patents, are the following:

The complete elimination of the air and oil intake control valves 47 and their coil springs 49;

The elimination of all of the manifold fluid intake extensions 42$^f$;

The elimination of the triangularly shaped valve extensions 43$^c$ and their air intake passages 48;

The elimination of all auxiliary fluid by-pass valves 65;

The substitution of a new improved manifold 42 provided with new improved fluid intake and discharge porting designated by numerals respectively 600, 601, 602, and 400, 401; and The substitution of a new improved air and oil circulation control valve.

*The air and oil circulation control valve*

The fluid intake and discharge control valve, shown more clearly in Figs. 8 and 9 and generally designated by numeral 500, consists of a cylindrical hollow body 505 provided with an annular flange 500ª at its outer end which is provided with primary air intake passage means consisting of three radially disposed air intake channels 501, circularly equally spaced, within the inner face of the flange; the channels 501 terminate as channels of rectangular cross-section within the medial portion of the cylindrical body 505 and, at their inner ends, each channel 501 communicates with a group of three closely adjacently disposed air intake ports 502, 503 that extend parallelly inwardly outwardly within the valve body 505 at an angle oblique to the axis of the clutch and terminate within the outer periphery of the valve body 505 in outlet openings of the general configurations as they appear in Fig. 3 when viewed on the valve seat line W looking in the direction of arrow A in Fig. 2.

Cast integrally with flange 500ª are three lugs 43ᵉ which are circularly equally spaced on the outer face of the flange 500ª and each perforated therethrough as at 500ᵇ to receive therein the inner end of one of the valve shifter rods 53; the lugs 43ᵉ being arcuately undercut to receive therein a snap ring 54 that operatively interconnects the shifter rods 53 with the valve 500. Three screws 60 secured in the manifold 42 extend through circularly equally spaced openings 500ᶜ in the marginal portion of flange 500ª and constitute means for preventing rotation of the valve 500 relatively to the manifold 42 and also as stop means for limiting the outermost position of the valve 500. The valve is also provided with three circularly equally spaced comparatively narrow fluid discharge slots 504 which in actual practice have been only about 1⁄16 of an inch in width and which extend inwardly from the outer periphery of the valve body 505 only partially into the valve body sufficiently to intersect therein the outer ends of three discharge ports 305, circularly equally spaced, and that extend radially inwardly of the body 505 from their outer ends near the outer periphery of the body to their inner discharge ends that open into the inner cylindrical face of the body 505; the discharge ports 305 preferably being slightly wider axially of the valve than the slots 504 and the valve 500 being axially movable upon the manifold valve seat 42ᵈ by the shifter rods 53. About the cylindrical face of valve seat 42ᵈ is an annular groove 42ᵉ for the pressure stabilization of fluid flowing from the manifold ports 401 into the valve slots 504.

A well known shifter fork (not shown) may readily simultaneously shift the collar 58 and sleeve 55 to transmit axial movements to the shifter rods 53 and valve 500.

*The air circuit during neutral clutch operation*

Referring to Figs. 1, 2, 6 and 7, the air enters the valve 500 through the three radial intake channels 501, then flows through primary air intake passage means each preferably consisting of a group of three closely adjacently disposed parallel air intake ports 502, 503; each group of three intake ports 502, 503 communicating with the inner end of one intake channel 501. The manifold 42 is provided, within its central valve seat 42ᵈ, with secondary air intake passage means preferably comprising three circularly equally spaced groups of air inlet ports 601 and 602 shown generally in Fig. 4 as viewed on the valve seat line W in Fig. 2 looking in the direction of arrow B. Each group of three air intake ports 601 and 602 extends in the manifold valve seat at an oblique angle to the axis of the clutch and communicates with a common recess 600 within the inner face of the manifold and each group of ports 601 and 602 is adapted to be longitudinally aligned in registration with the corresponding group of air intake ports 502 and 503 within the fluid flow control valve 500 when the valve is in neutral clutch operating position as shown in Figs. 1, 2 and 6 when only air is being circulated through the gear pump. The outlet ends of each group of three ports 601 and 602 communicate with one of the manifold recesses 600.

From the manifold recesses 600, the air is drawn axially into the intake cavities 36ᵇ for flow around the planet and sun gears and discharge into the discharge cavities 34ᵇ and then successively through the manifold recesses 400, manifold ports 401, valve slots 504 and finally through valve discharge ports 305 into the air zone within the center of the clutch casing generally shown in Fig. 1 by broken lines Z.

*The oil circuit*

The oil from the oil annulus enters the pump body inlet openings 36ª, then flows through intake ports 36 into intake cavities 36ᵇ, then around planet gears into pump body fluid discharge cavities 34ᵇ, then axially from discharge cavities 34ᵇ into manifold discharge recesses 400 (see Fig. 6), then through manifold discharge ports 401, then in metered volumetric flow through peripheral arcuate slots 504 of fluid flow control valve 500, and finally through the three discharge ports 305 into the air zone within the center of the clutch casing.

*Operation*

During the neutral operation of the clutch, oil from the oil annulus has entered through the oil inlet openings 36ª into the pump ports 36 wherein it assumes a relatively fixed radial level which is substantially that of the inner annular periphery of the oil annulus defined by the broken lines Z in Fig. 1. The oil is prevented from entering the pump intake cavities 36ᵇ and the adjacent regions of the gear teeth by centrifugal forces acting upon the oil during the rotation of the clutch housing.

The neutral operating conditions described in the preceding paragraph are provided by the novel porting which is schematically shown in Fig. 10, to illustrate, during such neutral clutch operation, the relationship of valve air intake ports 502 and 503 and their matched relation with companion air intake ports 601 and 602 in the valve seat. Fig. 10 also shows the corresponding relationship of the fluid discharge slots 504 in the valve to the fluid discharge ports 401 in the manifold valve seat, which slot and discharge port relationship controls the fluid discharge.

Fig. 11 schematically shows the relative positions of the ports and slots when the fluid control valve is partially advanced toward engagement whereat the valve air ports 503, which are employed primarily for enhanced neutral operation of the clutch, are now entirely out of register with their companion air ports 602 in the valve seat, consequently the air flow that is available through this unique suction control system has been substantially reduced. The reduced intake of air flow, which is now under the sole control of the valve's air intake ports 502 and their co-action through partial registration with the tear-shape contoured air intake ports 601 in the valve seat, no longer satisfies the demand of the pump suction for fluid, and therefore some oil is drawn in through inlet openings 36ª and passages 36 and 36ᵇ to supply the suction deficiency created by the airflow restriction. The two fluids, air and oil, intermix in the pump cavities 36ᵇ and the clutch transmits an increase in torque and/or speed to the output shaft. Note that the flow of oil into the pump circuit is not directly controlled or restricted by mechanical valve means but rather, has an unrestricted entry which in volume is affected by a restriction of air supply, and the demand of the gear pump for fluid volume, either air or oil but definitely a sufficient volume of either or a mixture of the two, and additionally by the magnitude of centrifugal forces acting upon the oil in the fluid reservoir and oil intake ports within the pump. Further description of the mechanically unrestricted oil flow phenomena as hereinabove described, and its effect on the character of operation of the clutch as compared to mechanically restricted oil flow control systems will be hereinafter set forth. Note also that the controlled discharge area, as defined by the position of the valve discharge slots 504 over the discharge ports 401 in the valve seat, is still unchanged from the area existing in Fig. 10.

Fig. 12 schematically shows a further advanced position of the valve toward engagement. Air intake ports 503 in the valve remain out of register with their companion air intake ports 602 in the valve seat. In addition, the main air intake control ports 502 have moved out of register with their companion tear-stape contoured ports 601 in the valve seat. All air admittance to the gear pumps has been arrested, and full, mechanically unrestricted oil flow enters the pump cavities 36$^b$ and pump gear teeth resulting in transmission of considerably more torque and/or speed to the output shaft. The increase in torque and/or speed has also been implemented by an increase in discharge pressure of the gear pumps, as it will be noted in Fig. 12 that the slot 504 in the valve is now disposed over a reduced area portion of the valve seat's discharge opening 401.

Fig. 13 illustrates relative positions of the ports and slots during the fully engaged position of the control valve. All air ports 502 and 503 remain out of register with the companion ports 601 and 602 in the valve seat, consequently only oil is available to the suction circuit of the gear pumps and, in this position of the control valve, the slots 504 in the valve are also completely out of register with the valve seat discharge ports 401. These valve seat discharge ports 401 being closed, the fluid discharge from the gear pumps is arrested, the pumps are hydrostatically locked and the output shaft of the clutch is being driven at substantially the same speed as the clutch housing.

The general character of the performance obtained from variable speed hydraulic clutches embodying the herein disclosed improvements is uniquely different from that of my prior clutch, particularly in the enhanced functional adaptations of these improved clutches to certain types of uses or drive applications wherein a more stable, gradual and precise control over the output shaft's delivery of torque and speed and less "yielding" of the selected speed to imposed load changes, during partially engaged positions of the fluid control valve, are desired. Design variation of the size of auxiliary air control ports 503 and 602, and more particularly the size and shape of the main air control ports 502 and 601, and the size and shape of the discharge ports 401 including the width of the discharge control slot 504 in the fluid flow control valve, as well as the phase relationship of the fluid discharge control to the air suction control, now may be more readily made by those skilled in the art to obtain various desired patterns of torque and speed control as a result of the novel principles, arrangement and combination herein disclosed.

The particularly different inherent or "automatic" character of performance of drives embodying the herein disclosed new control system results in "automatically" resisting any change of selected output shaft speed, such speed resulting from selected, fixed, partially engaged positions of the control valve, when load changes of considerable magnitude are imposed upon the output shaft. For example, operating under a predetermined restriction of air and magnitude of centrifugal forces, any reduction of output shaft speed due to a load increase causes an increase in the demand of the gear pumps for fluid volume. Since the air volume is fixed, the increased suction demand is automatically met by additional oil flow from the unrestricted unvalved oil intake ports 36$^a$ and 36 for admixture with the fixed flow of air. The increased viscosity of the pumped mixture must pass through a discharge area which, though precisely correct for the selected operating speed and load for the output shaft, now becomes inadequate, causing an increase in the hydrostatic working pressure for the gear pump and resulting in higher output torque to meet the increased load with a minimum of output shaft speed reduction. Conversely, any increase in selected speed, due to a load decrease, causes a decrease in volume or oil required to supply the pump demand, the fluid being pumped is less viscous and pump working pressure decreases to meet the lighter load with a minimum of output shaft speed increase.

The preceding paragraphs describe the operation of the drive, first in neutral and then in progressive stages to full engagement. From any selected valve position that is beyond the neutral position illustrated in Fig. 10 and that precedes the fully engaged position illustrated in Fig. 13, the fluid flow control valve can be returned to the full neutral position with the intake ports in registration as in Fig. 10, and the drive will promptly disengage due to air ports 601 and 602 being fully open, while simultaneously the discharge ports 401 are fully open through the valve discharge slots 504 and the centrifugal forces cause a withdrawal of all oil from the pump suction circuit so that air replaces the oil as the pump circulating fluid and the drive operates in neutral.

I claim:

1. In a variable speed and torque transmitting hydraulic clutch interposed between rotary power-driven means and a driven shaft and comprising a rotatable casing operatively connected with said power-driven means and having a chamber therein partially filled with oil whereby, during the rotation of said casing, there is provided in said chamber an outer annnular zone of oil and an inner central zone of air, and fluid pumping means operatively connected with said casing and with said driven shaft: the improvement which consists in a single fluid flow control valve for said pumping means disposed within the zone of air, comprising a cylindrical hollow body, a plurality of radially disposed air intake channels circularly equally spaced within the axially-outer end of said body, each channel communicating at its inner end within said body with three closely adjacently disposed air intake ports within said body extending outwardly at an angle oblique to the axis of the clutch and terminating within the outer periphery of said body, the central one of said three air intake ports being elongated in cross-section axially of the valve relatively to the other two of said air intake ports of cylindrical bore and the openings at the discharge ends of all of said air intake ports disposed within the outer periphery of said body, having corresponding edges aligned in a plane disposed transversely to the axis of the valve, a plurality of circularly equally spaced narrow fluid discharge slots extending inwardly from the outer periphery of said body and each intersecting a fluid discharge port that extends radially inwardly from its outer inlet end near the outer periphery of said body to its open discharge end within the inner cylindrical face of said body, said discharge ports preferably being slightly wider, axially of the valve, than their intersecting discharge slots, a seat for said valve on said pumping means having therein a plurality of groups of three closely adjacently disposed air intake ports having outlet openings communicating with the outlet openings of oil intake ports in said pumping means and having inlet openings adapted to register with the outlet openings of said air intake ports of said valve, the central one of said three air intake ports of each of said valve seat groups being elongated and tear-shaped in cross-section axially of the clutch relatively to the other two companion air intake ports of each of said valve seat groups which are of cylindrical bore, said valve being axially movable to vary the degree of registration of said valve air intake ports with said valve seat air intake ports, whereby variable speed and/or torque is transmitted to said driven shaft upon axial movement of said valve during rotation of the clutch.

2. In a variable speed and torque transmitting hydraulic clutch interposed between rotary power-driven means and a driven shaft and comprising a rotatable casing operatively connected with said power-driven means and having a chamber therein partially filled with oil whereby, during the rotation of said casing, there is provided in said chamber an outer annular zone of oil and an inner central zone of air, and fluid pumping means operatively connected with said casing and with said driven shaft: the improvement which consists in a valve seat on said pumping means having secondary air intake passage means, a single fluid flow control valve disposed within the zone of air, comprising a cylindrical hollow body mounted for axial movement on said valve seat, a radially disposed air intake channel within the outer end of said body having an open inlet end within the zone of air and communicating at its inner end, within said body, with primary air intake passage means extending rearwardly outwardly within said body at an angle oblique to the axis of the clutch and terminating within the outer periphery of said body, said primary air intake passage means being adapted to communicate with said secondary air intake passage means to control flow therethrough of a metered volume of air during a portion of the initial outward movement of the valve from its neutral operating position and thereafter to progressively restrict the volume of the flow of air therethrough during further outward movement of the valve, and a fluid discharge slot within the outer periphery of said body intersecting a discharge port that extends radially inwardly from its outer inlet end near the outer periphery of said body to its discharge end within the inner cylindrical face of said body, whereby, upon axial movement of said valve during rotation of the clutch casing the speed and/or torque of said driven shaft is varied.

3. In the character of clutch herein disclosed, the improvement as set forth in claim 2 including a manifold for said fluid pumping means providing said valve seat for said valve, said pumping means having a fluid intake cavity and a fluid discharge cavity, said primary air intake passage means in said valve adapted to selectively variably register with said secondary air passage means in the manifold and communicate with said fluid intake cavity in said pumping means, a fluid discharge port in the manifold communicating with said fluid discharge cavity in said pumping means and adapted to communicate with said fluid discharge slot in said valve, said valve being movable to progressively vary the degree of registrability of said primary air intake passage means with said secondary air intake passage means to vary the volumetric flow of air into said intake cavity and thereby control the volumetric inflow of oil into said pumping means.

4. A variable speed and torque transmitting hydraulic clutch interposed between rotary power-driven means and a driven shaft and comprising a rotatable casing operatively connected with said power-driven means and having a chamber therein partially filled with oil whereby, during the rotation of said casing, there is provided in said chamber an outer annular zone of oil and an inner central zone of air, fluid pumping means operatively connected with said casing and with said driven shaft, a plurality of unvalved oil intake ports for said pumping means having inlet openings, disposed within the zone of oil, constantly fully open to the inflow of oil into said fluid pumping means, air intake passage means permitting flow of air from said central zone of air into said pumping means, and a single valve disposed within the zone of air adapted to control and meter the flow of oil in relatively varied proportions to the flow of air into said pumping means in response solely to the metered control of the flow of air by said single valve to counteract the centrifugal force acting upon the oil, said valve being actuable to permit flow of only air, or of relatively varied proportionate mixtures of air and oil, or of only oil, into said pumping means to thereby vary the speed and/or torque of said driven shaft.

5. In a variable speed and torque transmitting hydraulic clutch as set forth in claim 4 wherein said air intake passage means consists of a plurality of primary air intake passages in said valve and a plurality of secondary air intake passages in said pumping means, said primary and secondary air intake passages being adapted to be in maximum registration when said valve is in neutral position affording circulation of only air through said pumping means, said valve being movable to progressively vary the degree of registrability of said primary air intake passages with said secondary air intake passages to vary the volumetric flow of air into said pumping means and thereby control the volumetric inflow of oil in relative proportions to the volumetric inflow of air.

6. A variable speed and torque transmitting hydraulic clutch interposed between rotary power-driven means and a driven shaft and comprising a rotatable casing operatively connected with said power-driven means and having a chamber therein partially filled with oil whereby, during the rotation of said casing, there is provided in said chamber an outer annular zone of oil and an inner central zone of air, fluid pumping means operatively connected with said casing and with said driven shaft, an air intake passage, having an inlet opening disposed within said zone of air, adapted to communicate with said pumping means, an independent oil intake passage, having a constantly fully open inlet opening disposed within said zone of oil, communicating with said pumping means, the oil being initially restrained within said oil intake passage from flow into power transmitting function with said pumping means, during rotation of the clutch casing, by centrifugal force and unrestricted flow of air through said air intake passage, valve means interposed in said air intake passage to control and meter the flow of air into said pumping means whereby, in response to the actuation of said valve means, the flow of both air and oil fluids through said pumping means, independently or in relatively variable proportionate mixtures, is controlled concurrently with the control of the discharge of the fluids to thereby vary the speed and/or torque of said driven shaft.

7. A variable speed and torque transmitting fluid clutch interposed between rotary power-driven means and a driven shaft and comprising a rotatable casing operatively connected with said power-driven means and having a chamber therein partially filled with oil whereby, during the rotation of said casing, there is provided in said chamber an outer annular zone of oil and an inner central zone of air, fluid circulating power-transmitting means including air suction, oil suction, and fluid discharge circuits, said fluid circulating power-transmitting means being disposed within said casing and being operatively connected with said casing and said driven shaft, valve means within said casing for regulating the flow of fluid through said air suction and fluid discharge circuits of said power-transmitting means, the oil suction circuit embodying a constantly fully open oil inlet system and the air suction circuit providing an air inlet system having predetermined volumetric capacity reducible by said valve means to completely arrest the flow of air therethrough, whereupon the said constantly fully open oil inlet system permits only oil to flow to said power-transmitting means, said valve means being adjustable to provide only air, or mixtures of relatively varied proportions of air and oil, or of only oil to said fluid circulating power-transmitting means to thereby vary the speed and/or torque of said driven shaft.

8. A variable speed and torque transmitting fluid clutch as set forth in claim 7 wherein, during neutral operation of the clutch when said valve means is adjusted so that only air is circulated by said power-transmitting means, the flow of oil is retained, by centrifugal force, within said oil inlet system but subject to automatically released flow and admixture with the air in relatively varied proportions for coaction in said power-transmitting means responsibly to reductions in the inflow of air by selective adjustment of said valve means.

9. A variable speed and torque transmitting fluid clutch as set forth in claim 7 wherein said discharge circuit is controllable by said valve means to provide a predetermined volumetric capacity during use of only air or mixtures of relatively varied proportions of air and oil as a fluid circulant through the power-transmitting means, said discharge circuit being further controllable by said valve means to entirely arrest the flow of fluid from the power-transmitting means to cause substantial unity of rotation of the power-transmitting means and the driven shaft.

10. In fluid operated variable speed and torque transmitting apparatus for use with a rotary source of power and a driven shaft, said apparatus including a fluid circulating pump and a rotatable container providing a chamber therein, and an annular zone of oil and a zone of air within said chamber: the improvement which consists in providing said pump with an oil intake port having a constantly fully open inlet opening in said zone of oil providing for free passage of oil from said zone of oil into said pump and with an air intake port having an inlet opening in said zone of air, the oil in said oil intake port being held in suspended flow solely by centrifugal force and by a regulated flow of air through said air intake port to meet the fluid intake requirements of said pump when said container is rotated, and valve means cooperating with said air inlet opening for regulating the flow of air from said zone of air into said pump to modify the effect of the centrifugal force upon the oil in said oil intake port and to release the flow of oil into said pump in variable proportions inversely relative to the volumetric flow of air into said pump.

11. In a variable speed and torque transmitting fluid clutch interposed between rotary power-driven means and a driven shaft and comprising a rotatable casing operatively connected with said power-driven means and having a chamber therein partially filled with oil whereby, during the rotation of said casing, there is provided in said chamber an outer annular zone of oil and an inner central zone of air, the combination comprising a pump operatively connected with said casing and said driven shaft, said pump having an oil intake port extending between said inner and outer zones and providing a continuously open oil intake opening in said outer zone, said pump also having a fluid discharge port and having an air intake passage providing an air intake port disposed in said inner central zone, and a valve means movably mounted within said casing and being operative upon movement in one direction to gradually restrict the flow of air into said pump through said air intake port and thereby gradually increase the relative proportion of oil in the fluid mixture passing through said pump, the inflow of oil through said oil intake port being restrained by centrifugal force upon rotation of said casing and by the inflow of air through said air intake passage, the suction of said pump drawing increasing proportions of oil therethrough as said air intake port is progressively restricted.

References Cited in the file of this patent

UNITED STATES PATENTS

| | | |
|---|---|---|
| 1,935,400 | Junkers | Nov. 14, 1933 |
| 2,526,914 | Thomas | Oct. 24, 1950 |
| 2,531,014 | Thomas | Nov. 21, 1950 |
| 2,658,595 | Thomas | Nov. 10, 1953 |
| 2,712,867 | Thomas | July 12, 1955 |